US012779447B2

(12) United States Patent
Higaki et al.

(10) Patent No.: US 12,779,447 B2
(45) Date of Patent: Nov. 3, 2026

(54) CELLULOSE-BASED ION-EXCHANGE MEMBRANE, PRODUCTION METHOD FOR SAME, EXOSOME PURIFICATION DEVICE, AND EXOSOME PURIFICATION METHOD

(71) Applicant: TOYOBO CO., LTD., Osaka (JP)

(72) Inventors: Ayano Higaki, Otsu (JP); Hirofumi Hakuba, Otsu (JP)

(73) Assignee: TOYOBO CO., LTD., Osaka (JP)

(*) Notice: Subject to any disclaimer, the term of this patent is extended or adjusted under 35 U.S.C. 154(b) by 916 days.

(21) Appl. No.: 17/920,135

(22) PCT Filed: Apr. 23, 2021

(86) PCT No.: PCT/JP2021/016532
§ 371 (c)(1),
(2) Date: Oct. 20, 2022

(87) PCT Pub. No.: WO2021/215539
PCT Pub. Date: Oct. 28, 2021

(65) Prior Publication Data

US 2023/0158483 A1 May 25, 2023

(30) Foreign Application Priority Data

Apr. 24, 2020 (JP) ................................ 2020-077436

(51) Int. Cl.

*B01J 41/16* (2006.01)
*B01D 69/02* (2006.01)
*B01J 41/04* (2017.01)
*B01J 47/014* (2017.01)
*C08J 5/22* (2006.01)

(52) U.S. Cl.

CPC .............. *B01J 41/16* (2013.01); *B01D 69/02* (2013.01); *B01J 41/04* (2013.01); *B01J 47/014* (2017.01); *C08J 5/2212* (2013.01); *B01D 2325/022* (2013.01); *B01D 2325/02833* (2022.08); *B01D 2325/02834* (2022.08); *B01D 2325/04* (2013.01); *B01D 2325/16* (2013.01); *B01D 2325/42* (2013.01); *C08J 2301/08* (2013.01)

(58) Field of Classification Search

CPC ............................ B01J 41/16; B01J 20/28085
See application file for complete search history.

(56) References Cited

U.S. PATENT DOCUMENTS

| | | | |
|---|---|---|---|
| 5,354,472 | A | 10/1994 | Voorhees et al. |
| 2004/0251193 | A1 | 12/2004 | Wu et al. |
| 2017/0198280 | A1 | 7/2017 | Skog et al. |
| 2019/0308169 | A1 | 10/2019 | Hummersone et al. |

FOREIGN PATENT DOCUMENTS

| | | | | |
|---|---|---|---|---|
| EP | 1470854 | A1 | 10/2004 | |
| JP | 4-4027 | A | 1/1992 | |
| JP | 7-81022 | A | 3/1995 | |
| JP | 8-503161 | A | 4/1996 | |
| JP | 2002-537106 | A | 11/2002 | |
| JP | 2017-67706 | A | 4/2017 | |
| JP | 2017-520264 | A | 7/2017 | |
| JP | 2019-527617 | A | 10/2019 | |
| NO | 2019/039179 | A1 | 2/2019 | |
| WO | 93/10899 | A2 | 6/1993 | |
| WO | 00/50161 | A1 | 8/2000 | |
| WO | 2016/007755 | A1 | 1/2016 | |
| WO | 2017/154951 | A1 | 9/2017 | |
| WO | 2018/011600 | A1 | 1/2018 | |
| WO | WO-2019137869 | A1 * | 7/2019 | ............ B01J 20/262 |

OTHER PUBLICATIONS

Kono et al. NMR characterization of cellulose acetate: Chemical shift assignments, substituent effects, and chemical shift additivity. Carbohydrate Polymers 2015, 118, 91-100. Available online Nov. 15, 2014. (Year: 2014).*
Zhang et al. Investigations on the interfacial capacitance and the diffusion boundary layer thickness of ion exchange membrane using electrochemical impedance spectroscopy. Journal of Membrane Science, 2016, 502, 37-47. Available online Dec. 5, 2015. (Year : 2015).*
Extended (Supplementary) European Search Report dated Apr. 24, 2024, issued in counterpart EP Application No. 21792531.2. (9 pages).
International Search Report dated Jul. 13, 2021, issued in counterpart International Application No. PCT/JP2021/016532 (3 pages).

* cited by examiner

*Primary Examiner* — Stephen E Rieth
(74) *Attorney, Agent, or Firm* — WHDA, LLP

(57) ABSTRACT

An object of the present invention is to provide an ion-exchange membrane for simply and inexpensively separating and purifying exosomes present in a biological sample such as serum. The invention relates to a cellulose-based ion-exchange membrane containing a cellulose-based polymer having at least one hydroxyl group or acetyl group at the 2-, 3-, or 6-position being replaced with a positively charged compound. The invention also relates to a method for purifying exosomes, including subjecting a sample containing exosomes to membrane permeation by using the cellulose-based ion-exchange membrane to allow for adsorption of the exosomes, bringing the membrane into contact with a washing liquid to remove impurities, and bringing the membrane into contact with an eluent to allow for desorption of the exosomes.

7 Claims, 3 Drawing Sheets

CELLULOSE-BASED ION-EXCHANGE MEMBRANE, PRODUCTION METHOD FOR SAME, EXOSOME PURIFICATION DEVICE, AND EXOSOME PURIFICATION METHOD

TECHNICAL FIELD

The present invention relates to an ion-exchange membrane for purifying exosomes to a high degree of purity.

BACKGROUND ART

Exosomes are extracellular vesicles of about 30 to 150 nm in diameter that are released by eukaryotic cells of animals, plants, fungi, etc. Exosomes are known to have important functionality in intercellular communication, such as encapsulating and propagating proteins, mRNA, or miRNA in body fluids. The involvement of exosomes in increased metastasis and exacerbation of cancer has been suggested, and recent years have seen the development of diagnostic markers focusing on exosomes, such as biomarkers for predicting cancer progression or for confirming metastasis or prognosis of cancer, using miRNA expressed from exosomes derived from cancer as a tumor marker.

Exosomes are also expected to have applications in drug delivery systems (DDS) as biological transporters encapsulating intracellular products such as nucleic acids and proteins by separating them from living organisms and purifying them. Thus, there is demand for technology to separate and refine exosomes to a high degree of purity.

Exosomes can be separated and purified by ultracentrifugation such as centrifugal fraction and density-gradient centrifugation, precipitation using polymers such as polyethylene glycol, and chromatography such as size exclusion chromatography and affinity chromatography. A common method is ultracentrifugation, and density-gradient centrifugation may yield highly purified exosomes. However, ultracentrifugation has drawbacks such as structural changes in exosomes during the centrifugation process, deterioration in quality due to disruption, and a low recovery rate.

Filtration using a filter is known as a separation and purification method other than the ultracentrifugation techniques described above. This method is simpler than ultracentrifugation because it can separate foreign substances from exosomes by using a filtration membrane with a pore size suitable for exosome separation. However, the method is not suitable for high-volume separation and purification due to clogging of the filter surface caused by foreign substances, and it is also difficult to recover exosomes captured on the filter.

PTL 1 discloses a separation and recovery method using a perforated substrate formed of a porous material as a method for recovering exosomes from filters with high purity. Although the invention can recover exosomes at a high capture rate, the recovery process requires the application of ultrasonic vibration, electric fields, or pressure.

Other known methods for recovering exosomes with high purity include a method using antibody-coated magnetic beads, and a method using peptide-loaded magnetic beads (PTL 2 and 3). The use of magnetic beads increases the raw material costs for the magnetic material and restricts the recovery technique.

PTL 4 discloses a cellulose membrane containing ion-exchange groups. The ion-exchange membrane is disclosed as being prepared by hydrolyzing a porous cellulose acetate membrane with an alkali and introducing cationic groups such as diethylaminoethyl groups (DEAE groups).

CITATION LIST

Patent Literature

PTL 1: WO2017/154951A
PTL 2: JP2017-067706A
PTL 3: WO2019/039179A
PTL 4: JPH07-081022A

SUMMARY OF INVENTION

Technical Problem

The present invention is intended to solve the technical problems described above, and an object of the invention is to provide an ion-exchange membrane capable of separating and purifying exosomes with high purity and at low cost.

Solution to Problem

The present inventors conducted extensive research and found that the problems can be solved by the means described below, and completed the invention.

Specifically, the present invention includes the following subject matter.

1. A cellulose-based ion-exchange membrane comprising a cellulose-based polymer having at least one hydroxyl group or acetyl group at the 2-, 3-, or 6-position being replaced with a positively charged compound.
2. The cellulose-based ion-exchange membrane according to Item 1, wherein the positively charged compound is a tertiary amine and/or a quaternary ammonium.
3. The cellulose-based ion-exchange membrane according to Item 1 or 2, having a minimum pore size of 50 nm to 600 nm.
4. The cellulose-based ion-exchange membrane according to any one of Items 1 to 3, having an ion-exchange capacity of 0.03 meq/g to 0.9 meq/g.
5. The cellulose-based ion-exchange membrane according to any one of Items 1 to 4, having an average thickness of 10 μm to 1000 μm.
6. The cellulose-based ion-exchange membrane according to any one of Items 1 to 5, having a zeta potential of 10 mV to 70 mV as measured at a pH within the range of 6.5 to 7.5.
7. The cellulose-based ion-exchange membrane according to any one of Items 1 to 6, wherein pores with a pore size of 30 nm or more have a specific surface area of 8 $m^2/g$ or more.
8. The cellulose-based ion-exchange membrane according to any one of Items 1 to 7, having an asymmetric structure in which the pore size increases from one surface to the other surface.
9. A device for exosome purification, comprising the cellulose-based ion-exchange membrane of any one of Items 1 to 8.
10. A method for producing the cellulose-based ion-exchange membrane of any one of Items 1 to 7, comprising
   producing a porous substrate membrane containing a cellulose-based polymer, and
   replacing at least one hydroxyl group or acetyl group at the 2-, 3-, or 6-position with a positively charged compound.

11. A method for purifying an exosome, comprising
    subjecting a sample containing an exosome to membrane permeation by using the cellulose-based ion-exchange membrane of any one of Items 1 to 7 or the device of Item 9 to allow for adsorption of the exosome,
    bringing the membrane into contact with a washing liquid to remove an impurity, and
    bringing the membrane into contact with an eluent to allow for desorption of the exosome.

Advantageous Effects of Invention

The ion-exchange membrane of the present invention has an "asymmetric structure" in which the pore size increases or decreases from one surface to the other surface in the membrane thickness direction. This enhances the separation of exosomes with a diameter of 30 to 150 nm while controlling the membrane permeability of large foreign substances contained in biological fluids, such as apoptotic bodies. Additionally, the positively charged groups allow the membrane to electrostatically capture negatively charged exosomes. Thus, exosomes are easily separated and purified from the culture supernatant with high purity.

DESCRIPTION OF EMBODIMENTS

Figure 1:
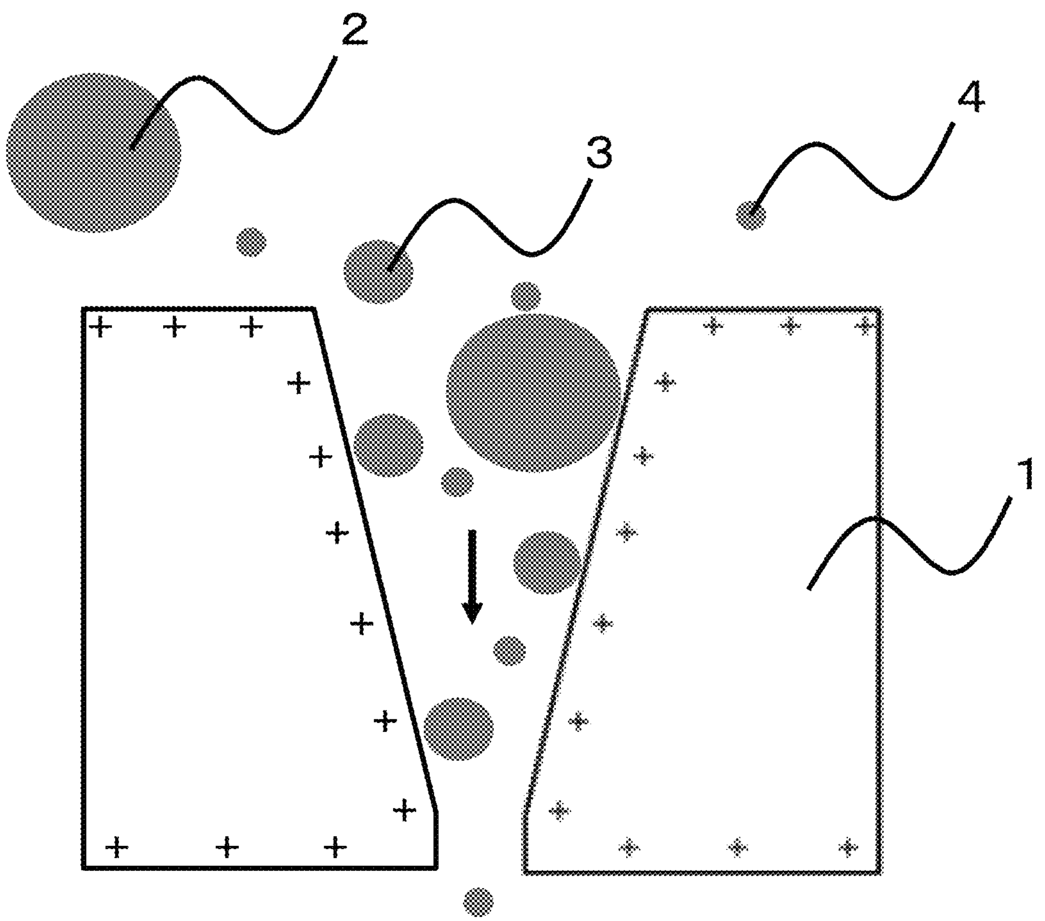
FIG. 1 is a diagram showing the concept of exosome separation using the ion-exchange membrane of the present invention.

The present invention relates to a cellulose-based ion-exchange membrane containing a cellulose-based polymer having at least one hydroxyl group or acetyl group at the 2-, 3-, or 6-position being replaced with a positively charged compound.

In the present invention, cellulose-based polymers include cellulose acetate, cellulose propionate, cellulose butyrate, cellulose acetate propionate, cellulose acetate butyrate, cellulose acetate laurate, cellulose acetate oleate, and cellulose acetate stearate. From the standpoint of ease of introducing the positively charged compound, cellulose acetate is preferred. Cellulose acetate is commercially available with different degrees of acetylation and molecular weights. Cellulose acetate or cellulose triacetate with a degree of acetylation of about 52 to 62 is more preferred.

In the present invention, it is preferable to use a tertiary amine represented by the following formula (I) or a quaternary ammonium compound represented by the following formula (II) as the positively charged compound. In the formulas, $R^1$ to $R^3$ are identical or different and represent a hydrogen atom or linear or branched $C_{1-10}$ alkyl group, and n of the methylene group is an integer of 1 to 5. In the formulas, X represents at least one member selected from the group consisting of halogen atoms such as fluorine, chlorine, bromine, and iodine, leaving groups such as sulfonic esters such as tosylate, triflate, and mesylate, silyl groups such as alkoxysilyl and silanol, epoxide groups, isocyanate groups, and carboxylic acid groups. The positively charged compound may have any substituent X. From the standpoint of availability of starting materials, a compound with chlorine, a silyl group, or an epoxide group as X is preferable.

(I)

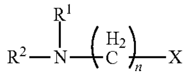

(II)

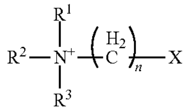

In the present invention, the cellulose-based ion-exchange membrane may be a uniform membrane, in which the pore size is substantially constant from one surface to the other, or an asymmetric membrane, in which the pore size varies continuously or discontinuously from one surface to the other. The ion-exchange membrane preferably has a minimum pore size of 50 nm to 600 nm. In an asymmetric membrane, a minimum-pore-size layer is preferably near either surface. A large minimum pore size decreases the probability of contact of exosomes with the membrane and/or pore surface and may thus result in a low adsorption rate of exosomes in a target liquid to be treated ("target liquid" below). Additionally, cell debris and apoptotic vesicles may not be removed. On the other hand, a small minimum pore size may decrease the recovery rate of exosomes that are present inside the membrane or take longer for recovery. Thus, the minimum pore size is more preferably 55 nm to 400 nm, and still more preferably 60 nm to 300 nm. The minimum pore size of the ion-exchange membrane is defined as the polystyrene particle size at which the rejection rate is 80% or more as measured using a polystyrene particle dispersion as described later.

The average pore size of the surface of the ion-exchange membrane (the surface without the minimum-pore-size layer) is preferably 100 nm or more and 5000 nm or less. A small average pore size of the surface may result in slower processing speed. A large average pore size of the surface may increase the amount of exosomes that leak out without being adsorbed by the membrane, resulting in a lower recovery rate. An average surface pore size too large or too small may also fail to exhibit the effect of depth filtration. As described later, the average pore size of the surface can be determined by using Image J processing software from a photograph of the membrane surface (one surface and the other surface) taken at a magnification of 1000 to 20,000 with a scanning electron microscope (SFM).

In the present invention, the target liquid may be treated by cross-flow filtration or by dead-end filtration. When an asymmetric membrane is used, the target liquid may be introduced from the large-pore side or from the small-pore side. For example, when loading a biological sample that has a low concentration of solid components and a high concentration of exosomes (e.g., a culture supernatant) onto the membrane to allow for adsorption of exosomes through charging onto the membrane, it is possible to prevent the adsorbed exosomes from clogging the membrane pores by setting the surface with a large pore size as the primary side and the surface with a small pore size as the secondary side, as shown in FIG. 1. On the other hand, in biological samples with a higher concentration of solid components relative to the concentration of exosomes (e.g., serum, plasma, urine, and milk), it is possible to remove foreign substances by surface filtration and prevent clogging of the membrane caused by complete clogging of pores by setting the surface with a small pore size as the primary side and the surface with a large pore size as the secondary side (see FIG. 1).

In the present invention, the ion-exchange capacity of the cellulose-based ion-exchange membrane is preferably 0.05 meq/g to 1.5 meq/g. A small ion-exchange capacity may result in an insufficient zeta potential value of the membrane, and may not be able to sufficiently attract the particles in a sample such as a target substance of purification with a small diffusion coefficient (e.g., exosomes) to the membrane, leading to a smaller adsorption amount, and thus requiring a high-capacity device. On the other hand, a large ion-exchange capacity may result in a membrane not strong enough or clogging of the membrane due to an overly large adsorption amount per unit volume of the membrane. When a tertiary amine compound is used, the ion-exchange capacity is preferably 0.03 meq/g to 0.9 meq/g based on the membrane weight. When a quaternary ammonium compound is used, the ion-exchange capacity is preferably 0.03 meq/g to 0.4 meq/g based on the membrane weight.

In the present invention, although the cellulose-based ion-exchange membrane may be in the form of a flat membrane or a hollow fiber membrane, the thickness of the membrane is preferably 10 μm to 1000 μm. A small membrane thickness may result in insufficient strength of the membrane, which may cause handling problems in membrane formation or device fabrication. On the other hand, a large membrane thickness may require more time to recover exosomes or reduce the recovery rate. Thus, the thickness of the membrane is more preferably 10 μm to 500 μm, and still more preferably 10 μm to 300 μm. For a hollow fiber membrane, the inner diameter is preferably 50 μm to 1000 μm. A small inner diameter may damage exosomes because of increased shear stress in the liquid flowing through the hollow part. On the other hand, a large inner diameter may result in a small membrane area per device. Thus, the inner diameter is more preferably 100 μm to 700 μm, and still more preferably 100 μm to 500 μm.

In the present invention, the zeta potential of the cellulose-based ion-exchange membrane is preferably within the range of 10 mV to 70 mV, more preferably 15 mV to 65 mV, and still more preferably 20 mV to 60 mV at a pH within the range of 6.5 to 7.5. A membrane with a zeta potential lower than 10 mV may not have sufficient adsorption properties with weak adsorbability for exosomes of a low diffusion coefficient. A membrane with a zeta potential higher than 70 mV may have decreased membrane strength. When particles such as exosomes are the target of purification, an adsorption amount per membrane unit volume that is too large may cause clogging in the membrane. The zeta potential of the cellulose-based ion-exchange membrane can be measured with a flat zeta potential measurement cell.

In the present invention, in regards to the specific surface area of the cellulose-based ion-exchange membrane, the total specific surface area of pores having a micropore size of 30 nm or more is preferably 8 $m^2/g$ or more, more preferably 15 $m^2/g$ or more, and still more preferably 20 $m^2/g$. A small specific surface area may result in an insufficient adsorption amount of exosomes. Specific surface area is typically measured by a gas adsorption method or a mercury intrusion method. The gas adsorption method can detect the specific surface area of micropores of about 2 nm or less and mesopores of 2 nm to 50 nm, whereas the mercury intrusion method can detect mesopores and macropores of 50 nm or more. Although a larger specific surface area is better to ensure the adsorption amount of exosomes, exosomes cannot penetrate pores with a pore size of less than 30 nm. Thus, in order to increase the adsorption amount of exosomes per membrane unit volume, the specific surface area composed of mesopores and macropores with a pore size of 30 nm or more must be sufficiently large. Although an overly large specific surface area of pores is not a problem, the specific surface area is preferably 150 $m^2/g$ or less, and more preferably 120 $m^2/g$ or less.

The porosity of the ion-exchange membrane is preferably 40% or more. A porosity too small decreases the region to which exosomes are adsorbed, whereas a porosity too large may lead to a failure to maintain the strength of the membrane. Thus, the porosity is more preferably 45% or more and 90% or less, still more preferably 50% or more and 85% or less, and even more preferably 55% or more and 85% or less.

When using the ion-exchange membrane of the present invention in separation and purification of exosomes, it is preferable to adjust the zeta potential, specific surface area, and porosity so as to fall within specific ranges. Exosomes are extracellular vesicles of 30 nm to 150 nm in size with a negative charge on their surface, as described above. For example, when efficiently adsorbing/desorbing exosomes in a biological sample or a cell culture supernatant, pores too small (too many micropores) cannot allow exosomes to penetrate the pores. Thus, even increasing the membrane area (specific surface area) cannot increase the adsorption area (adsorption capacity). Pores too large (too many macropores) make electrical attraction difficult to work due to a distance too large between the membrane surface and exosomes, or may decrease the efficiency of adsorption of the target exosomes because extracellular vesicles of more than 150 nm in diameter enter the pores. However, the ion-exchange membrane may be better to have some micropores in some cases. Biological samples and cell culture supernatants contain a large amount of various small molecular substances, many of which have an electrical charge. Adsorbing such small molecular substances onto micropores allows for effective use of the adsorption sites of mesopores or macropores for exosome adsorption. The specific surface area of pores with a pore size of less than 30 nm is preferably 30 $m^7/g$ or more and 80 $m^2/g$ or less.

The following describes the production of the cellulose-based ion-exchange membrane of the present invention.

In the present invention, the ion-exchange membrane may be produced by forming a membrane using a polymer having ion-exchange groups introduced, or may be produced by preparing a cellulose-based porous substrate membrane and then introducing ion-exchange groups. As an example of the latter, the following describes a method for obtaining a cellulose-based ion-exchange membrane by preparing a porous substrate membrane containing a cellulose-based polymer and then replacing at least one hydroxyl group or acetyl group at the 2-, 3-, or 6-position with a positively charged compound.

In the present invention, the porous substrate membrane containing a cellulose-based polymer is prepared, for example, by the following methods: a method of mixing a cellulose-based polymer with a solvent and a non-solvent to prepare a membrane-forming solution, ejecting the solution in a hollow shape, and drying it in the air (dry method); a method of introducing the ejected hollow membrane-forming solution into a coagulation bath and solidifying it (wet method); a method of rapidly changing the temperature of the ejected hollow membrane-forming solution (thermally induced phase separation); and a stretching method. Although any method may be used, the dry and wet method in which the membrane-forming solution is coagulated in a coagulation bath after being discharged is preferable because of the simplicity of membrane-forming management and elimination of the need for complicated equipment. A flat membrane can be prepared by dissolving a cellulose-based polymer in a solvent, applying the solution uniformly to a substrate such as glass, and immersing the substrate in a coagulation liquid to coagulate the solution, followed by washing and optionally drying, thereby producing a porous substrate membrane. The concentration of the cellulose-based polymer in the membrane-forming solution is preferably within the range of 5 wt % to 40 wt %, and more preferably 10 wt % to 35 wt %.

The solvent for use in preparing the membrane-forming solution is not limited as long as the solvent dissolves the cellulose-based polymer. Polar solvents such as γ-butyrolactone, N-methylpyrrolidone, and dimethylacetamide, which are commercially readily available and moderately viscous during membrane formation, are preferable. These solvents may be used alone as they are, or may be used in combination. Non-solvents such as water, glycerin, ethylene glycol, triethylene glycol, or polyethylene glycol (200, 400) may be optionally added. The mixing ratio of the solvent to the non-solvent (solvent/non-solvent) in the membrane-forming solution is preferably 90/10 to 10/90.

In the present invention, the coagulation liquid is preferably a mixed liquid composed of a solvent, a non-solvent, and water. The solvent/non-solvent ratio in the coagulation liquid preferably matches the solvent/non-solvent ratio in the membrane-forming solution. Matching the solvent/non-solvent ratio of the membrane-forming solution to that of the coagulation liquid reduces compositional fluctuations of the coagulation liquid during continuous membrane forming. In the case of a flat membrane, the weight ratio of N-methylpyrrolidone to water in the mixed solution is preferably within the range of 30:70 to 50:50, and more preferably 40:60 to 50:50. A coagulation bath with such a composition results in the pore size of the membrane surface that first comes in contact with the coagulation bath larger than the pore size of the membrane surface that is in contact with the substrate, forming an asymmetric structure in the thickness direction. A concentration of N-methylpyrrolidone of 25% or more and less than 30% in the coagulation bath tends to loosen the asymmetric structure of the membrane because the pore size of the membrane surface that first comes in contact with the coagulation bath becomes equivalent to the pore size of the membrane surface that is in contact with the substrate. Furthermore, a concentration of N-methylpyrrolidone of less than 25% in the coagulation bath makes it likely for a dense layer to form without distinct pores on the membrane surface that first comes into contact with the coagulation bath. The temperature of the coagulation liquid is preferably 5 to 60° C.

The obtained porous substrate membrane is washed with warm water to remove matter such as excess solvent. After washing, the porous substrate membrane may be stored in water, or the pores may be filled with a pore-retaining agent such as an aqueous glycerin solution and then dried.

The obtained porous substrate membrane is then treated to introduce ion-exchange groups. Specifically, deacetylation is performed, and then charging treatment is performed on hydroxyl groups. An example of methods for producing a cationic cellulose membrane (ion-exchange membrane) by replacing hydroxyl groups of a cellulose-based porous substrate membrane with positively charged groups is the following: the cellulose-based porous substrate membrane is immersed in a non-dissolving solvent in the presence of an alkali, and a solution of a positively charged compound is added dropwise, followed by a reaction with heating and then quenching with alcohol.

The non-dissolving solvent is not particularly limited as long as it is a solvent in which the cellulose-based porous substrate membrane is not dissolved but a positively charged compound is dissolved. Preferable examples include water, tetrahydrofuran (THF), dimethyl sulfoxide (DMSO), and dimethylformamide (DMF). These may be used alone or in combination depending on the solubility of the starting material.

Alkalis for use in deacetylation may be hydroxides such as lithium hydroxide, potassium hydroxide, sodium hydroxide, and cesium hydroxide, carbonates, or organic amines. Of these, sodium hydroxide, which is industrially available at low prices, is preferred. The concentration of the alkali for use is preferably within the range of 0.05% by mass to 5.0% by mass. The amount of the alkali is also preferably within the range of 1.0% by mass to 10.0% by mass based on the membrane weight. A low concentration of the alkali may result in a failure to increase the amount of introduced charged groups and thus fail to increase the adsorption amount of exosomes per unit volume. On the other hand, a concentration of the alkali too high increases the degree of swelling of the membrane, thus failing to maintain the structure of the substrate membrane (pore size) or physical properties (membrane strength) of the ion-exchange membrane into which charged groups have been introduced. Thus, the concentration of the alkali is more preferably 0.1 to 2.5% by mass, and more preferably 0.2 to 2.0% by mass.

The reaction temperature is preferably 50 to 80° C., and more preferably 50 to 70° C. A low reaction temperature may result in a decreased substitution rate of positively charged groups due to insufficient reaction. A high reaction temperature may lead to a thermally deformed membrane.

The amount of charged groups to be added to the cellulose membrane can be controlled according to the amount of the positively charged compound added. For example, if an epoxy group-containing tertiary amine compound is added, the concentration of the tertiary amine compound in the non-dissolving solvent is preferably within the range of 0.01 mol/L to 3.0 mol/L, and more preferably 0.02 mol/L to 1.5 mol/L. In this case, the ion-exchange capacity corresponds to 0.05 meq/g to 0.9 meq/g per cellulose membrane weight. If an epoxy group-containing quaternary ammonium compound is added, the concentration of the quaternary amine compound in the non-dissolving solvent is preferably within the range of 0.01 mol/L to 1.0 mol/L, and more preferably 0.02 mol/L to 0.5 mol/L. In this case, the ion-exchange capacity corresponds to 0.05 meq/g to 0.4 meq/g per cellulose membrane weight. An amount of positively charged groups added that is too large may result in higher water solubility and weaker membrane strength in water due to a high content of positively charged groups per polymer molecule. An amount of positively charged groups added that is too low may result in low exosome capture efficiency.

In the present invention, the ion-exchange membrane is preferably in the form of a device housed in a container with an inlet for introducing the target liquid and an outlet for discharging the ion-exchanged target liquid. The device has a first chamber and a second chamber separated by an ion-exchange membrane. The target liquid introduced into the first chamber permeates the ion-exchange membrane and moves to the second chamber. In this process, exosomes in the target liquid are adsorbed on the surface of the ion-exchange membrane and the surface of pores.

In the present invention, the method for separating and purifying exosomes by using an ion-exchange membrane preferably includes the following steps: passing a sample containing exosomes (target liquid) through the cellulose-based ion-exchange membrane to allow for adsorption of the exosomes, bringing the cellulose-based ion-exchange membrane into contact with a washing liquid to remove impurities, and bringing the cellulose-based ion-exchange membrane into contact with an eluent to allow for desorption of the exosomes.

Although the sample containing exosomes (target liquid) is not particularly limited, the target sample includes culture supernatants (cell culture medium), blood (serum, plasma), urine, spinal fluid, lymph fluid, ascites fluid, milk, and homogenized extracts.

The conditions for adsorption of exosomes on a cellulose-based ion-exchange membrane are not limited. The target liquid containing exosomes may be brought into contact with the ion-exchange membrane by cross-flow filtration or dead-end filtration as described above. The present invention uses the mechanism of charge adsorption of exosomes to a positively charged ion-exchange membrane (anion-exchange membrane) due to their negative surface charges. Because a filtration rate too high may damage the exosomes that pass through the interior of the membrane, the filtration rate is preferably 0.3 $mL/min/cm^2$ to 100 $mL/min/cm^2$.

Because impurities contained in the target liquid (e.g., proteins adsorbed due to charged adsorption or hydrophobic interaction) are also adsorbed on the ion-exchange membrane on which exosomes are adsorbed, it is preferable to perform washing treatment to increase the purity of the recovered exosomes. The washing liquid for use in the washing treatment is preferably a buffer or a buffer containing a low-concentration physiological saline. Examples of buffers include citrate buffers, phosphate buffers, Tris buffers, and phosphate buffered saline.

The ion-exchange membrane that has been washed to remove impurities is then brought into contact with an eluent to elute the exosomes adsorbed on the ion-exchange membrane. Exosomes adsorbed due to charging on the ion-exchange membrane can be easily desorbed by changing the salt concentration or pH. If a salt solution is used as an eluent, an aqueous sodium chloride solution is preferred. An aqueous sodium chloride solution for use may have a concentration within the range close to the electrolyte concentration of a living subject, such as 0.1 mol/L to 1.5 mol/L. A low salt concentration may not allow exosomes to elute. A high salt concentration may also reduce the purity of the recovered exosomes by eluting impurities that could not have been removed by washing. The exosome recovery rate is preferably 70% or higher.

EXAMPLES

Examples are given below to describe the present invention in detail. However, the invention is not limited to the Examples.

Preparation of Porous Substrate Membrane

Production Example 1

11% by mass of cellulose acetate (Sigma-Aldrich, molecular weight: 5000, degree of substitution: 2.45), 53% by mass of γ-butyrolactone (Nacalai Tesque, Inc.), and 36% by mass of N-methylpyrrolidone ("NMP" below; Nacalai Tesque, Inc.) were homogeneously dissolved, thereby preparing a membrane-forming solution. After degassing the membrane-forming solution for 2 hours, the solution was spread evenly on a glass plate by using an applicator with a gap of 0.2 nm at room temperature and at a relative humidity of 62%. The whole glass plate was gently put into a coagulation liquid (NMP/water (RO water)=48/52) to allow the solution to coagulate. After coagulation was complete, the membrane was pulled from the coagulation liquid and washed with water, thereby obtaining porous substrate membrane 1.

Production Example 2

Porous substrate membrane 2 was obtained according to the method described in Production Example 1, except that the mixing ratio of NMP/water (RO water) of the coagulation liquid was changed to 55/45.

Production Example 3

Porous substrate membrane 3 was obtained according to the method described in Production Example 1, except that the mixing ratio of NMP/water (RO water) of the coagulation liquid was changed to 60/40.

Preparation of Ion-Exchange Membrane

Example 1

Porous substrate membrane 1 obtained in Production Example 1 was immersed in an aqueous sodium hydroxide solution of 0.4% by mass at room temperature for 4 hours to perform deacetylation. For the obtained membrane, sodium hydroxide was used as a catalyst in an amount of 5% by mass based on the weight of the membrane, and water was added to give a sodium hydroxide concentration of 0.3% by mass, followed by immersing the membrane. Glycidyltrimethylammonium chloride (GTMAC; Tokyo Chemical Industry Co., Ltd.) was added in an amount of 0.15 mol/L, and the membrane was cationized by reaction at 65° C. for 4 hours, thereby preparing ion-exchange membrane 1.

Example 2

Ion-exchange membrane 2 was prepared in the same manner as in Example 1, except that porous substrate membrane 2 obtained in Production Example 2 was used.

Example 3

Ion-exchange membrane 3 was prepared in the same manner as in Example 1, except that porous substrate membrane 3 obtained in Production Example 3 was used.

Example 4

Ion-exchange membrane 4 was prepared in the same manner as in Example 1, except that the amount of glycidyltrimethylammonium chloride added was changed to 0.23 mol/L.

Example 5

Ion-exchange membrane 5 was prepared in the same manner as in Example 1, except that N,N-diethyl-N-glycidyl amine (DOA, Enamine Ltd.) was used instead of glycidyltrimethylammonium chloride.

Example 6

The porous substrate membrane obtained in Production Example 1 was swollen with an aqueous sodium hydroxide solution of 6% by mass (20° C.) and placed in a bath with a weight ratio of sodium hydroxide to N,N-diethyl-N-glycidyl amine of 4:7, and a total concentration of the sodium hydroxide and N,N-diethyl-N-glycidyl amine in the aqueous solution of 4% by mass, followed by a reaction at a bath temperature of 75° C. for 20 minutes. After the reaction ended, the porous substrate membrane was washed with deionized water and dried, thereby obtaining ion-exchange membrane 6.

Evaluation of Particle Blocking Rate

The rejection rate of the porous substrate membranes and ion-exchange membranes was evaluated using a dispersion of polystyrene particles. Solutions prepared by dispersing 0.01% by mass of polystyrene particles of various sizes in an aqueous solution of Tween 20 were permeated through a membrane under an operating pressure of 10 kPa, thereby obtaining a permeation liquid. The concentration of polystyrene particles in the original solution and in the permeation liquid was measured at an absorbance of 250 nm, and the rejection rate was calculated using the following formula.

$$\text{Blocking rate (\%)}=\{1-(Ca-Cb)/Ca\}\times 100$$

Ca: Concentration of polystyrene particles in the original solution

Cb: Concentration of polystyrene particles in permeation liquid

Polystyrene particles with a particle size of 79, 132, 208, 262, 313, 420, 460 or 616 nm were used to measure the rejection rate, and the polystyrene particle size at which the rejection rate was 80% was defined as the minimum pore size.

Table 1 shows the rejection rate of each of the porous substrate membranes produced in Production Examples 1 to 3.

TABLE 1

| | | Polystyrene Particle Rejection Rate (%) | | | | | | | | Minimum Pore | Surface Pore Size | | Membrane | |
|---|---|---|---|---|---|---|---|---|---|---|---|---|---|---|
| | | | | | | | | | | | On Small Pore | On Large Pore | | |
| | NMP/ Water | 79 nm | 132 nm | 208 nm | 262 nm | 313 nm | 420 nm | 460 nm | 616 nm | Size nm | Size Side nm | Size Side nm | Thickness μm | Membrane Structure |
| Substrate Membrane 1 | 48/52 | — | 0 | 0 | 80 | 100 | — | — | — | 262 | 395 | 463 | 106 | Asymmetric |
| Substrate Membrane 2 | 55/45 | — | — | — | 20 | 85 | 90 | 100 | 100 | 300 | 602 | 817 | 98 | ↑ |
| Substrate Membrane 3 | 60/40 | — | — | — | — | 10 | 40 | 50 | 90 | 560 | 890 | 1215 | 102 | ↑ |

Observation of Membrane Structure

Each of the obtained membranes was placed on a sample table for SEM, dried at room temperature, deposited with platinum, and observed with a scanning electron microscope (SU-1500, Hitachi).

Measurement of Average Pore Size of Membrane on Large Pore Size Side

The average pore size of each membrane on the large-pore-size side was measured by using SEM images of the surface of the membranes observed at 10000× according to the following procedure. An image was opened with ImageJ image-processing software, and a line was drawn in the range of the scale bar using a straight line tool from the toolbar. "Analyze>Set Scale" was selected, and the length of the scale bar was entered in "Known Distance," and the unit was entered in "Unit of length." In "Image>Adjust>Auto Threshold," the "Method" mode was set to the default, and "OK" was selected to binarize the image. In "Analyze>Set Measurements," "Feret's diameter" was confirmed to have been selected, and "OK" was pressed. In "Analyze>Analyze Particles," "Size(pixel^2)" was set to "0-Infinity," and the "Display results," "Exclude on edge," and "Include holes" boxes were confirmed to have been selected, followed by selecting "OK," thereby obtaining measurement data for the Feret's diameter on the Results screen. In order to eliminate noise of 15 pixels or below, the length corresponding to 15 pixels was calculated in the same unit as the Feret's diameter, and values below the length were eliminated to calculate the average Feret's diameter.

Measurement of Ion-Exchange Capacity

The ion-exchange capacity was measured as follows. An aqueous solution of bromophenol blue (BPB) of 0.1% by mass was prepared, and a membrane was immersed in the solution for 1 hour to dye the membrane. The dyed membrane was washed with water and then immersed in an aqueous sodium chloride solution of 8% by mass to elute BPB adsorbed on the membrane. The absorbance at 590 nm of the 8% aqueous sodium chloride solution from which BPB was eluted was measured, and the number of moles of BPB adsorbed on the cationized membrane was calculated.

Measurement of Zeta Potential

The zeta potential of each membrane was determined by attaching a flat-plate zeta potential measurement cell (ZEN1020) to a Zetasizer Nano ZS (Malvern), and measuring the mobility of aluminum oxide particles in ion-exchanged water at a pH of 6.5 to 7.5.

Measurement of Specific Surface Area and Porosity

The specific surface area and porosity were measured with a pore size distribution analyzer (AutoPore V9620, Micromeritics) under the following conditions.

0.06 to 0.08 g of a sample was placed in a standard cell (volume: 6 mL) and measured under an initial pressure of 2.2 kPa (corresponding to a pore size of about 560 μm). Mercury parameters were set as follows: instrument default mercury contact angle of 130.0 degrees, and mercury surface tension of 485.0 dynes/cm. The pore distribution curve was determined by plotting the transition of log differential volume of mercury penetrating the sample with respect to the pore size. The porosity was determined from the pore volume obtained by the Dubinin-Astakhov (DA) method. For specific surface area, pore volume V was measured for each mode diameter D, and specific surface area S for each mode diameter D was determined from the following formula. The total specific surface area was calculated from the sum of the values within the range of 0.03 μm to 500 μm.

$$S=4V/D$$

Recovery of Exosomes Using Culture Supernatant

A culture medium of HEK-293 cells was centrifuged at a low velocity to obtain a supernatant from which free cells were removed. The membranes (diameter: 25 mm) obtained in the Examples and Comparative Examples were individually immobilized to a holder, and the culture supernatant was permeated at a permeation rate of 2 mL/min. Subsequently, a trisphosphate buffer (5 mL) was passed through the membranes to remove impurities in the membranes, and then a 0.8M aqueous sodium chloride solution (10 mL) was passed through the membranes. The recovery rate of exosomes in the aqueous sodium chloride solution after passage was determined by measuring the number of particles within the range of 10 nm to 900 nm before and after treatment with a nanoparticle analysis system (NanoSight, Malvern Panalytical). The supernatant derived from HEK-293 cells contained exosomes at a concentration of $2\times10^9$ cells/mL.

Comparative Example 1

A recovery test was performed on exosomes by using porous substrate membrane 1 obtained in Production Example 1.

solvent was a mixture containing water and DMSO (water: DMSO=1:1), and that the amount of glycidyltrimethylammonium chloride added was changed to 6 mol/L.

Comparative Example 4

An ion-exchange membrane was prepared in the same manner as in Example 1, except that C300A047A (Advantec) was used for the porous substrate membrane.

Comparative Example 5

An ion-exchange membrane was prepared in the same manner as in Example 1, except that the amount of glycidyltrimethylammonium chloride added was changed to 0.01 mol/L.

Table 2 summarizes the results of various tests using the membranes obtained in Examples 1 to 6 and Comparative Examples 1, 3, 4 and 5 and the results obtained in Comparative Example 2.

TABLE 2

| | Alkali Concentration during Reaction Percent by Mass | Positively Charged Compound | Ion-exchange Capacity meg/g | Membrane Swelling during Reaction | Zeta Potential mV | Specific Surface Area (30 nm or More) $m^2/g$ | Specific Surface Area (Less than 30 nm) $m^2/g$ | Porosity % | Exosome Recovery Rate HEK Culture Supernatant % |
|---|---|---|---|---|---|---|---|---|---|
| Example 1 | 0.3 | GTMAC | 0.2 | Less then 10% | 41 | 52 | 66 | 72 | 44 |
| Example 2 | 0.3 | ↑ | ↑ | ↑ | 43 | 38 | 53 | 77 | 38 |
| Example 3 | 0.3 | ↑ | ↑ | ↑ | 44 | 28 | 39 | 83 | 36 |
| Example 4 | 0.3 | ↑ | 0.3 | ↑ | 49 | 53 | 74 | 72 | 50 |
| Example 5 | 0.3 | DOA | 0.1 | ↑ | 34 | 51 | 71 | 72 | 78 |
| Example 6 | 4.0 | ↑ | 0.8 | 128 | 57 | 49 | 69 | 72 | 65 |
| Comparative Example 1 | — | — | — | — | — | — | — | — | 3 |
| Comparative Example 2 | — | — | — | — | — | — | — | — | 10 |
| Comparative Example 3 | 0.3 | GTMAC | 3.0 | Jellied (Membrane Structure Collapsed) | Not Measureable | Not Measureable | Not Measureable | Not Measureable | Not Measureable |
| Compatative Example 4 | 0.3 | DOA | 0.2 | Less than 10% | 38 | 3 | 9 | 79 | 25 |
| Comparative Example 5 | 0.3 | GTMAC | 0.03 | Less than 10% | 2 to 9 | 52 | 66 | 72 | 9 |

Comparative Example 2

The culture medium derived from HEK-293 cells was centrifuged at a low velocity to obtain a supernatant from which free cells were removed. The supernatant was ultracentrifuged at 150,000×g for 3 hours, and pellets were resuspended in a Tris buffer.

Comparative Example 3

Figure 2:
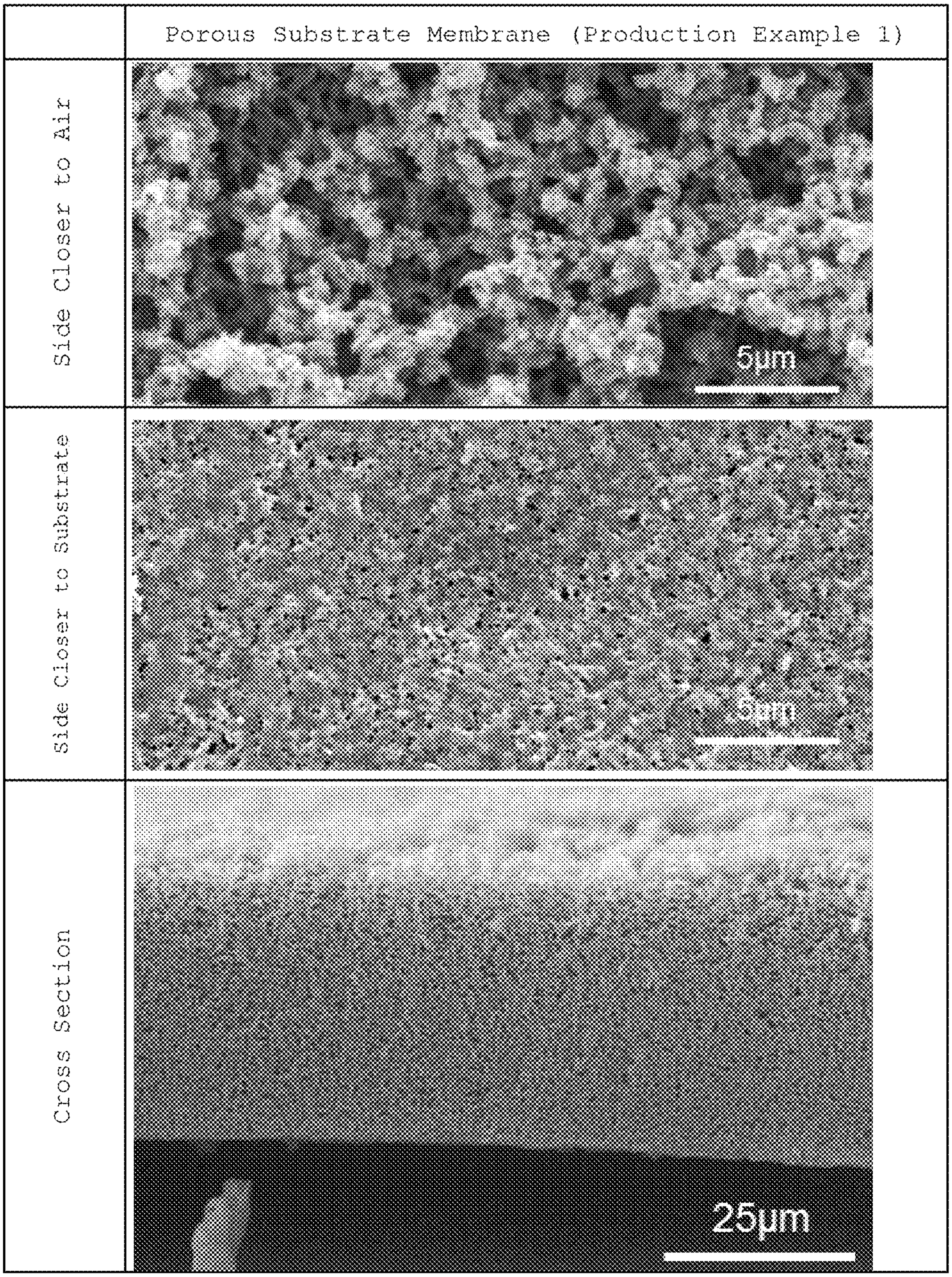
FIG. 2 is a scanning electron micrograph of the porous substrate membrane of Production Example 1.
Figure 3:
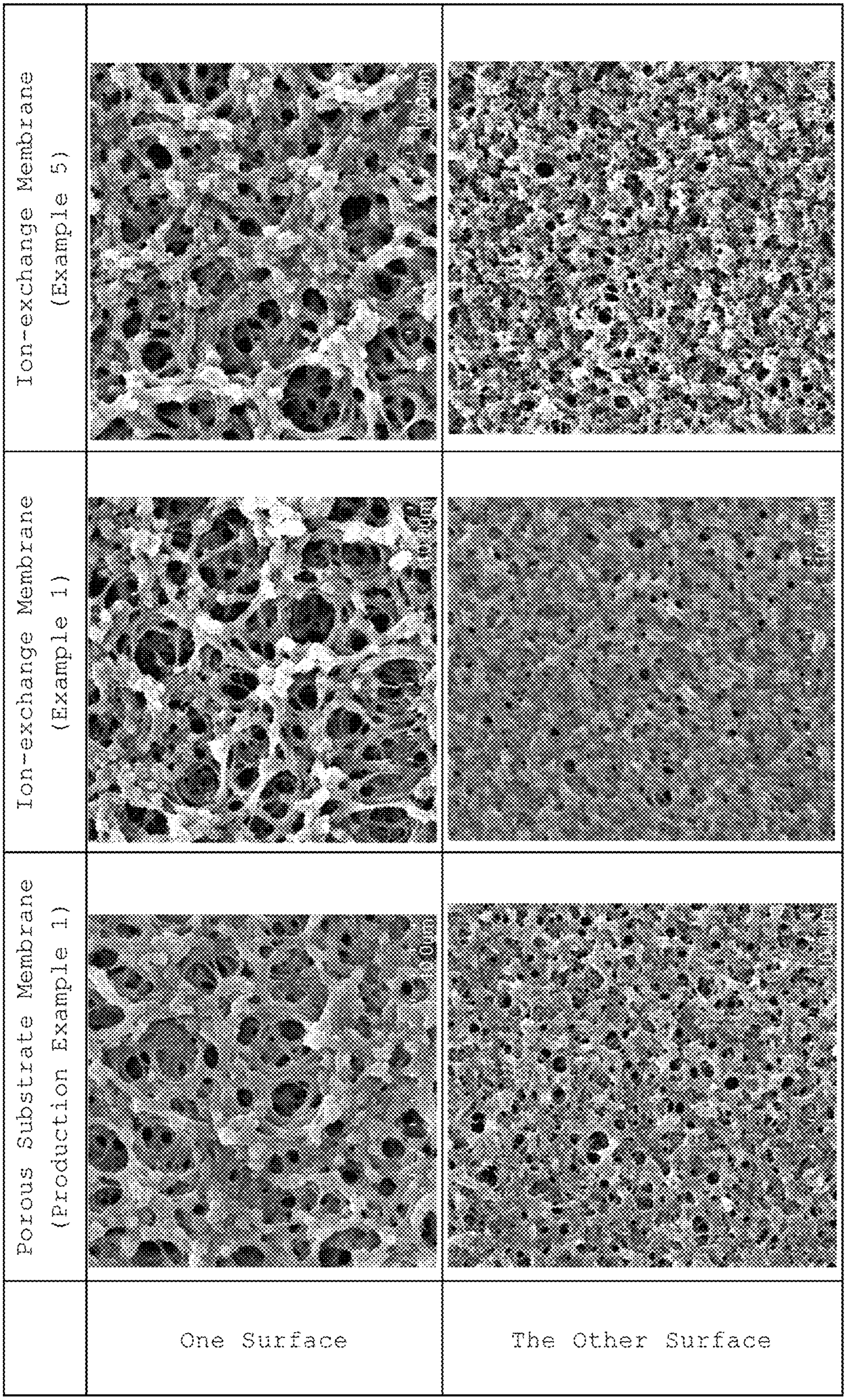
FIG. 3 is a scanning electron micrograph of the ion-exchange membrane of the present invention.

An ion-exchange membrane was prepared in the same manner as in Example 1, except that the non-dissolving As is clear from Table 2, the ion-exchange membranes in the Examples exhibit a high exosome recovery rate due to their excellent balance between the pore structure (micropores to macropores) and the asymmetry, as well as their proper ion-exchange capacity. As shown in FIG. 2, the porous substrate membrane of Production Example 1 was confirmed to have different pore sizes between the side closer to the substrate and the side closer to the air, and to have an asymmetric structure in which the pore size changed in the membrane cross-sectional direction. It is also clear from FIG. 3 that there is no significant change in the membrane structure, such as swelling, before and after the introduction of charged groups in the present invention (FIG. 3). However, porous substrate membrane 1 in Comparative Example 1 resulted in a low recovery rate, probably due to the low amount of exosomes adsorbed to the membrane. The membrane in Comparative Example 3 had an ion-exchange capacity too large to maintain the membrane shape. The membrane in Comparative Example 4 did not result in a sufficient exosome recovery rate, probably because the proportion of mesopores and macropores (specific surface area) was too small. The membrane in Comparative Example 5 did not result in a sufficient exosome recovery rate, probably due to its ion-exchange capacity being too low and zeta potential being too low.

INDUSTRIAL APPLICABILITY

The present invention enables purification and separation of exosomes contained in a biological sample in a simple manner at low cost.

DESCRIPTION OF THE REFERENCE NUMERALS

1 ion-exchange membrane
2 impurities (large)
3 exosome
4 impurities (small)

The invention claimed is:

1. A cellulose-based ion-exchange membrane comprising a cellulose-based polymer having at least one hydroxyl group or acetyl group at the 2-, 3-, or 6-position being replaced with a compound represented by formula (I) and/or a compound represented by formula (II), (I)

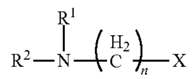

(II)

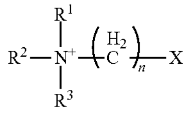

wherein $R^1$, $R^2$, and $R^3$ are identical or different and represent a hydrogen atom or linear or branched C1-10 alkyl group, and n of the methylene group is an integer of 1 to 5;

X represents at least one member selected from a group consisting of a halogen atom, a sulfonic ester, a silyl group, an epoxide group, an isocyanate group, and a carboxylic acid group, wherein the cellulose-based ion-exchange membrane has a minimum pore size of 50 nm to 600 nm, pores with a pore size of 30 nm or more have a specific surface area of 8 $m^2/g$ or more, the cellulose-based ion-exchange membrane has an average thickness of 10 μm to 1000 μm, the cellulose-based ion-exchange membrane has a zeta potential of 10 mV to 70 mV as measured at a pH within the range of 6.5 to 7.5 in ion-exchanged water using a flat-plate zeta potential measurement cell, and the cellulose-based ion-exchange membrane is configured for adsorption of an exosome.

2. The cellulose-based ion-exchange membrane according to claim 1, having an ion-exchange capacity of 0.1 meq/g to 0.9 meq/g, wherein the ion-exchange capacity is determined by immersing the cellulose-based ion-exchange membrane in an aqueous solution of bromophenol blue to adsorb bromophenol blue on the cellulose-based ion-exchange membrane, eluting the adsorbed bromophenol blue with an aqueous sodium chloride solution, and measuring absorbance of the aqueous sodium chloride solution.

3. The cellulose-based ion-exchange membrane according to claim 1, having an asymmetric structure in which the pore size increases from one surface to the other surface.

4. A method for producing the cellulose-based ion-exchange membrane of claim 1, comprising producing a porous substrate membrane containing a cellulose-based polymer, and replacing at least one hydroxyl group or acetyl group at the 2-, 3-, or 6-position with the compound represented by formula (I) and/or the compound represented by formula (II).

5. A method for purifying an exosome, comprising subjecting a sample containing an exosome to membrane permeation by using the cellulose-based ion-exchange membrane of claim 1 to allow for adsorption of the exosome, bringing the membrane into contact with a washing liquid to remove an impurity, and bringing the membrane into contact with an eluent to allow for desorption of the exosome.

6. A device for exosome purification, comprising the cellulose-based ion-exchange membrane of claim 1.

7. A method for purifying an exosome, comprising subjecting a sample containing an exosome to membrane permeation by using the device of claim 6 to allow for adsorption of the exosome, bringing the membrane into contact with a washing liquid to remove an impurity, and bringing the membrane into contact with an eluent to allow for desorption of the exosome.

* * * * *